US010057247B2

(12) United States Patent
Jakobsson

(10) Patent No.: US 10,057,247 B2
(45) Date of Patent: *Aug. 21, 2018

(54) SYSTEMS AND METHODS FOR DETERMINING A STRENGTH OF A CREATED CREDENTIAL

(71) Applicant: PayPal, Inc., San Jose, CA (US)

(72) Inventor: Bjorn Markus Jakobsson, Mountain View, CA (US)

(73) Assignee: PayPal, Inc., San Jose, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/983,364

(22) Filed: Dec. 29, 2015

(65) Prior Publication Data

US 2016/0112401 A1  Apr. 21, 2016

Related U.S. Application Data

(63) Continuation of application No. 13/724,409, filed on Dec. 21, 2012, now Pat. No. 9,245,107.

(51) Int. Cl.
*G06F 21/46* (2013.01)
*H04L 29/06* (2006.01)

(52) U.S. Cl.
CPC ............ *H04L 63/083* (2013.01); *G06F 21/46* (2013.01)

(58) Field of Classification Search
CPC ................................ G06F 21/46; H04L 63/083
USPC ........................................................ 726/1, 5
See application file for complete search history.

(56) References Cited

U.S. PATENT DOCUMENTS

| 5,862,323 | A | 1/1999 | Blakley, III et al. |
| 7,965,843 | B1 | 6/2011 | Maino et al. |
| 8,131,758 | B2 * | 3/2012 | Morris ............... G06F 17/2735 707/778 |
| 8,539,247 | B2 * | 9/2013 | McGrew ................ G06F 21/46 713/182 |
| 8,555,357 | B1 | 10/2013 | Gauvin |
| 9,245,107 | B2 | 1/2016 | Jakobsson |
| 2004/0073815 | A1 | 4/2004 | Sanai et al. |

(Continued)

OTHER PUBLICATIONS

Jakobsson et al., "The Benefits of Understanding Passwords", presented at HotSec '12, 7th USENIX Workshop on Hot Topics in Security, Aug. 7, 2012, https://www.usenix.org/conference/hotsec12/benefits-understanding-passwords, pp. 1-6.

*Primary Examiner* — Abu Sholeman
(74) *Attorney, Agent, or Firm* — Haynes & Boone, LLP

(57) ABSTRACT

Devices, systems, and methods for determining a strength of a created credential are provided. The device includes one or more processors configured to decompose a created credential into credential components, parse the credential components using a limited dictionary, determine a probability of the credential components using a limited ruleset, and calculate a score of the created credential based on the determined probability. The device also includes a memory, the memory storing the limited dictionary and the limited ruleset, and a network interface component coupled to a network, the network interface component configured to transmit the created credential to a remote server over the network for a secondary credential strength determination if the calculated score is above a threshold.

20 Claims, 4 Drawing Sheets

(56) References Cited

U.S. PATENT DOCUMENTS

| | | | |
|---|---|---|---|
| 2004/0168068 A1* | 8/2004 | Goal | G06F 21/46 713/184 |
| 2009/0019514 A1 | 1/2009 | Hazlewood et al. | |
| 2009/0150971 A1 | 6/2009 | Vedula et al. | |
| 2009/0171953 A1 | 7/2009 | Morris et al. | |
| 2009/0217056 A1 | 8/2009 | Malpani | |
| 2009/0313696 A1 | 12/2009 | Himberger et al. | |
| 2010/0031343 A1* | 2/2010 | Childress | G06F 21/46 726/18 |
| 2010/0154039 A1 | 6/2010 | Carolan | |
| 2010/0185546 A1* | 7/2010 | Pollard | G06Q 10/0637 705/80 |
| 2010/0185656 A1* | 7/2010 | Pollard | G06F 21/6245 707/769 |
| 2010/0186066 A1* | 7/2010 | Pollard | G06Q 20/40 726/3 |
| 2010/0208888 A1 | 8/2010 | Weber | |
| 2011/0016534 A1 | 1/2011 | Jakobsson et al. | |
| 2011/0090541 A1 | 4/2011 | Harper | |
| 2011/0314294 A1 | 12/2011 | McGrew et al. | |
| 2012/0216046 A1 | 8/2012 | McDougal et al. | |
| 2012/0246714 A1 | 9/2012 | Ma | |
| 2012/0272288 A1 | 10/2012 | Ashbrook et al. | |
| 2012/0284783 A1 | 11/2012 | Jakobsson | |
| 2013/0055366 A1 | 2/2013 | Chao et al. | |
| 2013/0055379 A1 | 2/2013 | Adams et al. | |
| 2013/0125221 A1 | 5/2013 | Agrawal | |
| 2013/0198744 A1 | 8/2013 | Zimmerman et al. | |
| 2013/0269010 A1 | 10/2013 | Wheeler | |
| 2013/0283337 A1 | 10/2013 | Schechter et al. | |
| 2013/0318578 A1 | 11/2013 | Palagummi | |
| 2013/0325715 A1 | 12/2013 | Rosko et al. | |
| 2014/0068733 A1* | 3/2014 | Belisario | G06F 21/46 726/6 |
| 2014/0115717 A1 | 4/2014 | Bjorn et al. | |
| 2015/0046993 A1 | 2/2015 | Arceo | |

* cited by examiner

SYSTEMS AND METHODS FOR DETERMINING A STRENGTH OF A CREATED CREDENTIAL

CROSS REFERENCE TO RELATED APPLICATIONS

This application claims priority to U.S. patent application Ser. No. 13/724,409 filed on Dec. 21, 2012, which is incorporated by reference in its entirety.

BACKGROUND

Technical Field

Embodiments disclosed herein are related to systems and methods for determining a strength of a created credential. In particular, systems and methods disclosed herein may provide a local initial strength determination and a remote secondary strength determination wherein both the initial and secondary strength determination analyze components of the created credential.

Related Art

Credentials such as passwords are used to provide security to a user's sensitive information and to grant a user access to content. For example, a user may be required to enter a correct credential to access certain information, such as financial information, and perform certain transactions, such as making a payment. Thus, secure and strong credentials are important to prevent unauthorized use or access to a user's account or information. Typically, the more obscure the credential or password or unrelated it is to the user, the harder it is for someone to correctly guess or determine the actual user credential. In addition, systems or sites may require the user to periodically change the credential for additional security. Thus, it is important for the user to select or change to a credential that is strong, as opposed to weak, and not easily determined by others even with knowledge of the previous credential.

However, users typically select or change credentials that are easy to remember. For the former, users may select a word, a phrase, a number, or a combination thereof that makes sense for the user, such as a name, a birthday, an address, or the like. For the latter, the user may slightly modify the previous credential by adding a number or replacing a number with the next number. These credentials may be easy for attackers to obtain, such as by guessing or other more analytical methods. This may then allow an attacker to access a user account, including make unauthorized payments or withdrawals, engage in identity theft, etc.

Thus, there is a need for systems and methods that determine a strength of a created credential, only allowing the credential to be created if it is determined to be sufficiently strong.

Figure 1:
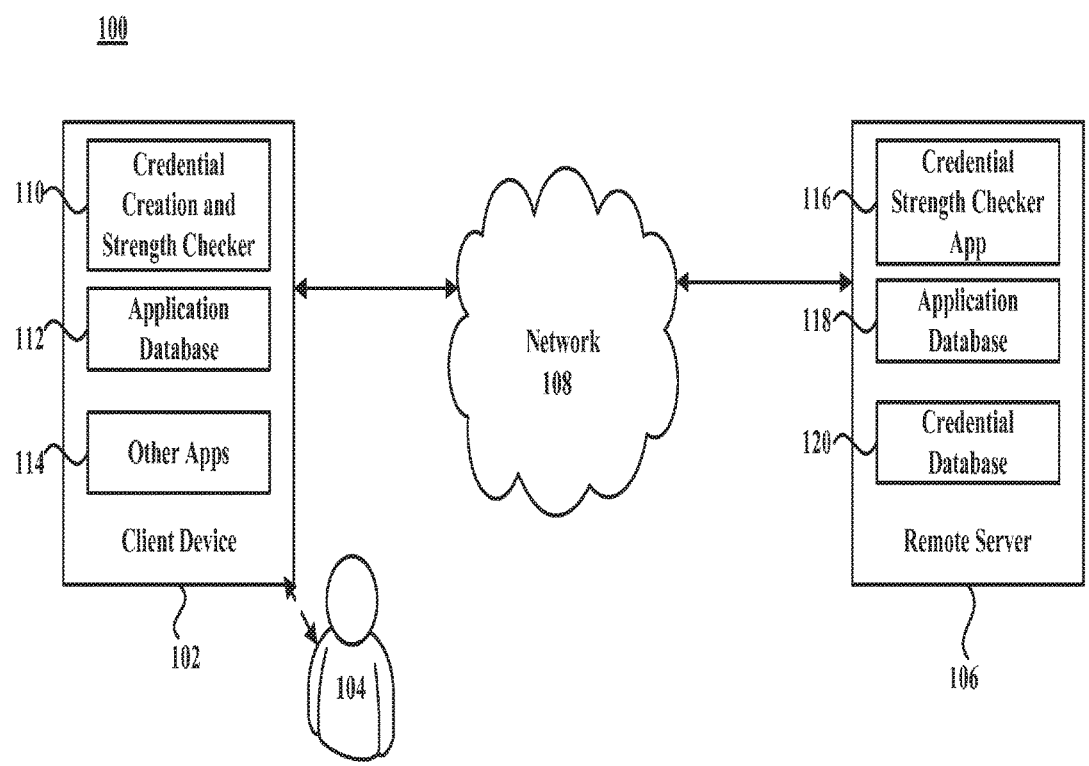
FIG. 1 is a block diagram of a networked system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

A user typically submits a proposed credential, such as a password, at the request of a remote server, system, or merchant as part of an account creation or maintenance process. Examples of remote servers or systems requiring a user to submit a proposed password include financial institutions, merchants, educational institutions, law firms, and the like, generally referred to herein as service providers. For example, a payment service provider, such as PayPal, Inc. of San Jose, Calif., may request the user to enter a proposed credential (along with a user identifier) in order to create an account with PayPal. After a year or another time period, PayPal may request the user to submit a new credential for security reasons. The user may be requested to submit a new credential at other non-periodic times, such as when the user account has been compromised or suspected of being compromised.

Once a credential is requested, such as through a client device, the user may enter and communicate the proposed credential from the client device to the remote server. The proposed credential may be communicated electronically, such as through a mobile, wireless, or cable network, to the remote server which may then determines whether the proposed credential is acceptable.

Consistent with some embodiments, there is provide a device for determining a strength of a created credential are provided. The device includes one or more processors configured to decompose a created credential into credential components, parse the credential components using a limited dictionary, determine a probability of the credential components using a limited ruleset, and calculate a score of the created credential based on the determined probability. The device also includes a memory, the memory storing the limited dictionary and the limited ruleset, and a network interface component coupled to a network, the network interface component configured to transmit the created credential to a remote server over the network for a secondary credential strength determination if the calculated score is above a threshold.

Consistent with some embodiments, there is also provided a non-transitory computer-readable medium having instructions for execution by one or more processors that, when executed, cause the one or more processors to perform a method for determining a strength of a created credential. The method includes decomposing the created credential into credential components, parsing the credential components using limited dictionaries, determining a probability of the credential components using limited rulesets, calculating a score of the created credential based on the determined probability, and transmitting the created credential to a remote server for a secondary strength determination of the calculated score is above a threshold.

Consistent with some embodiments, there is further provided a method for determining a strength of a created credential. The method includes performing, by a client device coupled to a network, an initial strength determination on the created credential, transmitting, by the client device, the created credential to a remote server coupled to the network if the initial strength determination determines that the created credential is sufficiently strong, performing, by the remote server, a secondary strength determination on the transmitted created credential, and storing, by the remote server, the transmitted created credential if the secondary strength determination determines that the created credential is sufficiently strong.

These and other embodiments will be described in further detail below with respect to the following figures.

FIG. 1 is a block diagram of a networked system 100, consistent with some embodiments. System 100 includes a client device 102 being used by a user 104 and a remote server 106 in communication over a network 108. Remote server 106 may be a payment service provider server that may be maintained by a payment provider, such as PayPal, Inc. of San Jose, Calif. Remote server 106 may be maintained by other service providers in different embodiments. Remote server 106 may also be maintained by an entity with which sensitive credentials and information may be exchanged with client device 102. Remote server 106 may be more generally a web site, an online content manager, a service provider, such as a bank, or other entity who provides content to a user requiring user authentication or login.

Network 108, in one embodiment, may be implemented as a single network or a combination of multiple networks. For example, in various embodiments, network 108 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client device 102, in one embodiment, may be implemented using any appropriate combination of hardware and/or software configured for wired and/or wireless communication over network 108. For example, client device 102 may be implemented as a wireless telephone (e.g., smart phone), tablet computer, personal digital assistant (PDA), notebook computer, and/or various other generally known types of wired and/or wireless mobile computing devices. For example, client device 102 may be a mobile device such as a smartphone such as an iPhone™ or other mobile device running the iOS™ operating system, the Android™ operating system, a BlackBerry™ operating system, the Microsoft® Windows® Phone operating system, Symbian™ OS, or webOS™. Client device 102 may also be a tablet computer, such as an iPad™ or other tablet computer running one of the aforementioned operating systems. Client device 102 may also be a PC or laptop or netbook, a set-top box (STB) such as provided by cable or satellite content providers, or a video game system console such as the Nintendo® Wii™, the Microsoft® Xbox 360™, or the Sony® PlayStation™ 3, or other video game system consoles. Consistent with some embodiments, client device 102 may include any appropriate combination of hardware and/or software having one or more processors and capable of reading instructions stored on a non-transitory machine-readable medium for execution by the one or more processors. Consistent with some embodiments, client device 102 includes a machine-readable medium, such as a memory (not shown) that includes instructions for execution by one or more processors (not shown) for causing client device 102 to perform specific tasks. For example, such instructions may include instructions for creating a user credential or password for authenticating client device 102 to remote server 106. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which one or more processors or computer is adapted to read.

Content may be displayed by particular applications or "apps" stored in a memory of client device 102 and executed by one or more processors executing in client device 102. One particular app that may be included on client device is a credential creation and strength checker application 110. Consistent with some embodiments, credential creation and strength checker app 110 may include instructions that when executed by one or more processors of client device 102 allow user 104 to create a credential for authenticating to remote server 106 and to perform a strength check on the created credential. Consistent with some embodiments, the created credential may be a password, and the strength check may be an initial strength check. Client device 102 may also include an application database 112 that provides stored information to applications such as credential creation and strength checker app 110 and other applications 114. Such information may include rules and dictionaries used to check a strength of a created credential. Other apps 114 may include a browser app that displays content, such as a web page or a user interface using a browser or additional features available to user 104, including accessing a user account with remote server 106. For example, other apps 114 may also include interfaces and communication protocols that allow the user to receive and transmit information through network 108 and to remote server 106 and other online sites. Other apps 114 may also include security applications for implementing client-side security features, programmatic client applications for interfacing with appropriate application programming interfaces (APIs) over network 108 or various other types of generally known programs and/or applications. Other apps 114 may include mobile apps downloaded and resident on client device 102 that enables user 104 to access content through the apps.

Remote server 106 according to some embodiments, may be maintained by an online payment provider, which may provide processing for online financial and information transactions on behalf of user 116. Remote server 106 may include at least credential strength checker application 116, which may be adapted to interact with client device 102 over network 108 to check a strength of a created credential. Consistent with some embodiments, the strength checking performed by credential strength checker application 116 may be a secondary strength check performed after an initial credential strength check performed by credential creation and strength checker application 110 has been passed. Remote server 106 may also include an application database 118 for storing various applications for interacting with client device 102 over network 108 for purposes other than credential creation and strength evaluation. Such applications may include applications for authentication, conducting financial transactions and shopping and purchasing items. Remote server 106 may also include a credential database 120 that includes information related to credentials, credential creation, and evaluating the strength of a created credential. Such information may include rules and dictionaries used by credential strength checker app 116 to evaluate a strength of a credential created by user 104 using credential creation and strength checker application 110 executing on client device 102.

Figure 2:
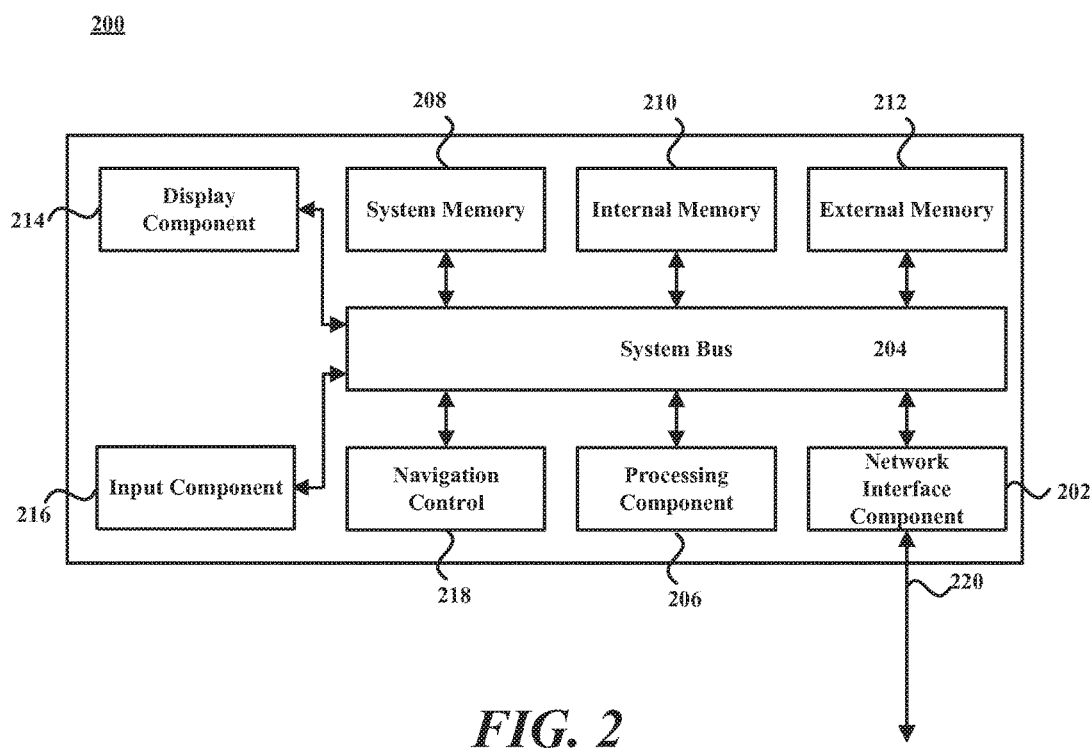
FIG. 2 is a diagram illustrating a computing system, consistent with some embodiments.

FIG. 2 is a diagram illustrating computing system 200, which may correspond to any of client device 102 or remote server 106, consistent with some embodiments. Computing system 200 may be a mobile device such as a smartphone such as an iPhone™ or other mobile device running the iOS™ operating system, the Android™ operating system, a BlackBerry™ operating system, the Microsoft® Windows® Phone operating system, Symbian™ OS, or webOS™ Computing system 200 may also be a tablet computer such as the iPad™ or other similar device running the aforementioned operating systems. Computing system 200 may also be a personal computer, a laptop computer, a netbook, or a tablet computer. Further, computing system 200 may also be a server or one server amongst a plurality of servers, as would be consistent with remote server 106. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 108. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 108.

Consistent with some embodiments, computing system 200 includes a system bus 204 for interconnecting various components within computing system 200 and communication information between the various components. Such components include a processing component 206, which may be one or more processors, micro-controllers, or digital signal processors (DSP), a system memory component 208, which may correspond to random access memory (RAM), an internal memory component 210, which may correspond to read-only memory (ROM), and an external or static memory 212, which may correspond to optical, magnetic, or solid-state memories. Consistent with some embodiments, computing system 200 further includes a display component 214 for displaying information to a user of computing system 200, such as user 104. Display component 214 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 216, allowing for a computing system 200 to input information to computing system 200. Such information could include payment information such as an amount required to complete a transaction, account information, authentication information, or identification information. An input component 216 may include, for example, a keyboard or key pad, whether physical or virtual. Computing system 200 may further include a navigation control component 218, configured to allow a user to navigate along display component 214. Consistent with some embodiments, navigation control component 218 may be a mouse, a trackball, or other such device. Moreover, if device 200 includes a touch screen, display component 214, input component 216, and navigation control 218 may be a single integrated component, such as a capacitive sensor-based touch screen.

Computing system 200 may perform specific operations by processing component 206 executing one or more sequences of instructions contained in system memory component 208, internal memory component 210, and/or external or static memory 212. In other embodiments, hard-wired circuitry may be used in place of or in combination with software instructions to implement the present disclosure. Logic may be encoded in a computer readable medium, which may refer to any medium that participates in providing instructions to processing component 206 for execution. Such a medium may take many forms, including but not limited to, non-volatile media, volatile media, and transmission media. The medium may correspond to any of system memory 208, internal memory 210 and/or external or static memory 212. Consistent with some embodiments, the computer readable medium is non-transitory. In various implementations, non-volatile media include optical or magnetic disks, volatile media includes dynamic memory, and transmission media includes coaxial cables, copper wire, and fiber optics, including wires that comprise system bus 204. According to some embodiments, transmission media may take the form of acoustic or light waves, such as those generated during radio wave and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 220 to network 108 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 220 and network interface component 202. Communication link 220 may be wireless through a wireless data protocol such as Wi-Fi™, 3G, 4G, HDSPA, LTE, RF, NFC, or through a wired connection. Network interface component 202 may include an antenna, either separate or integrated, to enable transmission and reception via communication link 220. Received program code may be executed by processing component 206 as received and/or stored in memory 208, 210, or 212.

Consistent with some embodiments, user 104 using computing system 200 that may correspond to client device 102 may wish to interact with remote server 106. In order to access services offered by remote server 106, user 104 may be required to authenticate to remote server 106. The authentication may require user 104 to provide a credential to remote server 106. If user 104 has not accessed remote server 106 previously, or needs to obtain a new credential for accessing remote server 106, user 104 may be required to create a credential. Consistent with some embodiments, user 104 may create a credential using credential creation and strength checker app 110. Moreover, in order to ensure that the created credential is sufficiently strong and not easily guessable by an attacker, credential creation and strength checker app 110 may perform an initial strength check of the created credential, and, if the created credential passes the initial strength check, it is transmitted over network 108 to remote server 106, where credential strength checker app 116 will perform a secondary check of the created credential. Consistent with some embodiments, the secondary check of the created credential by credential strength checker app 116 may be more robust than the initial strength check performed by credential creation and strength checker app 110.

Figure 3:
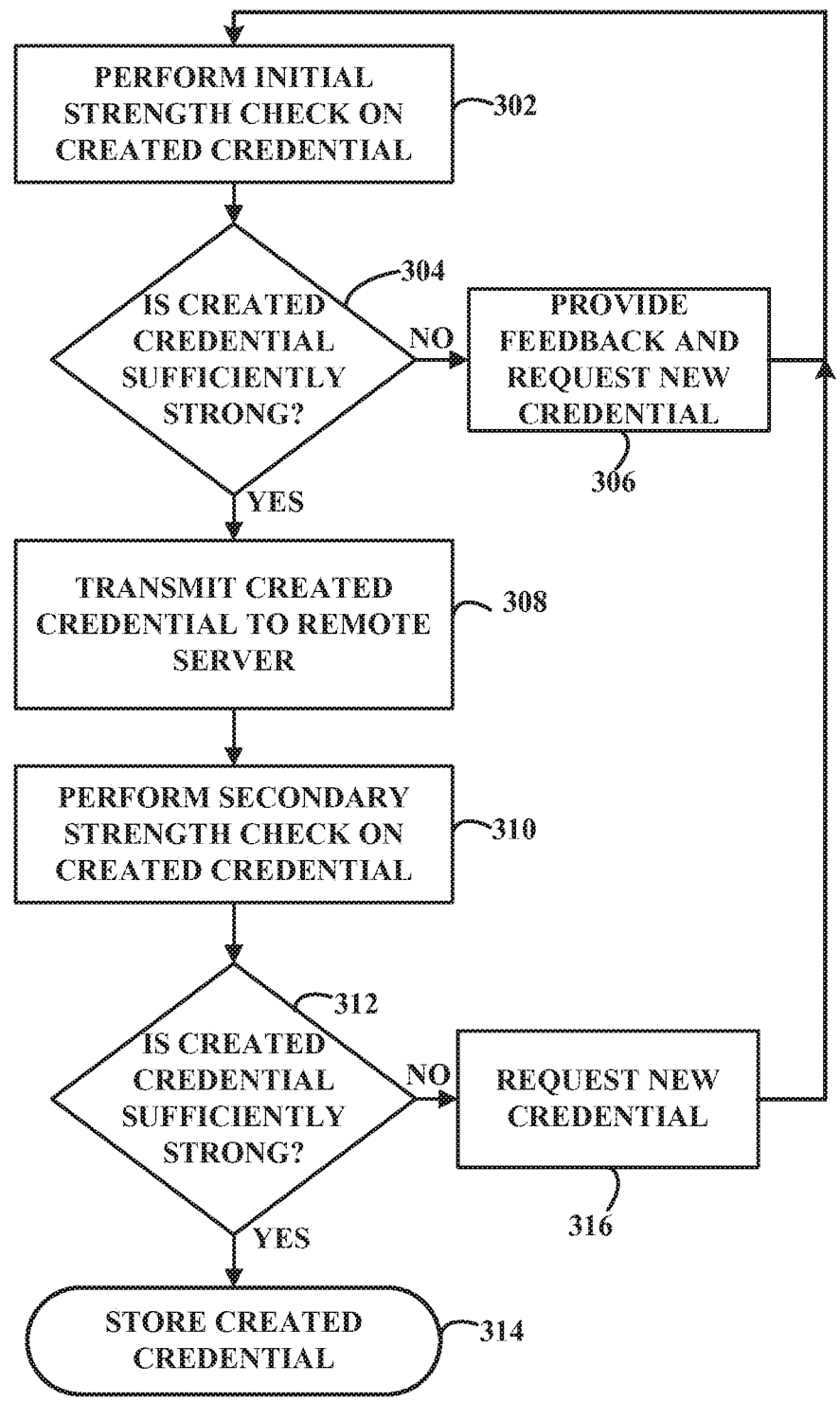
FIG. 3 is a flowchart illustrating a method for determining a strength of a created credential, consistent with some embodiments.

FIG. 3 is a flowchart illustrating a method for determining a strength of a created credential, consistent with some embodiments. For the purpose of illustration, FIG. 3 will be described with reference to FIGS. 1 and 2. The method shown in FIG. 3 may be embodied in computer-readable instructions for execution by one or more processors in processing component 206 of client device 102 and/or remote server 106. As shown in FIG. 3, credential creation and strength checker app 110 performs an initial strength check on a created credential (302). Consistent with some embodiments, the created credential is created from strings of components, where the components are dictionary words, numbers, and other characters. Moreover, the initial strength check may be performed using a limited dictionary and a limited ruleset, such as described in more detail in FIG. 4. According to some embodiments, the initial strength check may include decomposing the created credential into credential component using a lexicographic parser, determining a probability of the credential components using a limited ruleset, determining a probability of the created credential, calculating a score of the created credential, and comparing the calculated score to a threshold. Further, credential creation and strength checker app 110 may be provided by remote server 106, such that credential creation and strength checker app 110 is downloaded over network 108 from remote server 106 and stored in a memory of client device 102.

Returning to FIG. 3, based on the initial strength check performed by credential creation and strength checker app 110, client device 102 may make a determination as to whether the created credential is sufficiently strong (304). If the created credential is determined to not be sufficiently strong, credential creation and strength checker app 110 may provide feedback to user 104 and request a new credential (306). Consistent with some embodiments, feedback provided to user 104 may include a strength-meter that is displayed to user 104 on a display component 214 of client device 102 indicating a strength of the created credential. Feedback provided to user 104 may also include simply not allowing user 104 to submit the created credential. For example, credential creation and strength checker app 110 of client device 102 may perform the initial strength check on the created credential as user 104 enters the credential, only allowing user 104 to submit the created credential if it is sufficiently strong. If the created credential is determined to be sufficiently strong, the created credential is transmitted to remote server 106 (308). Credential strength checker app 116 on remote server 106 may then perform a secondary strength check on the created credential (310). Consistent with some embodiments, performing the secondary strength check may be performed by decomposing the credential into credential components, parsing the components with a dictionary that is significantly larger than the limited dictionary used by credential creation and strength checker app 110, and then determining a probability of the credential components using a larger ruleset, and then calculating a score. Further consistent with some embodiments, performing a secondary strength check on the created credential may include performing a strength check such as disclosed in U.S. patent application Ser. No. 13/460,378, filed on Apr. 30, 2012, and assigned to the same assignee as the present application, the entire contents of which are hereby incorporated by reference in their entirety.

Returning to FIG. 3, once the secondary strength check is performed on the created credential, a determination is made as to whether the created credential is sufficiently strong (312). If the created credential is sufficiently strong, it is stored in remote server 106 (314). According to some embodiments, the created credential is stored in credential database 120 of remote server 106 and associated with user 104. If the created credential is not sufficiently strong, a request for a new credential may be transmitted from remote server 106 to client device 102 (316), prompting user 104 to create a new credential, wherein the process may start over.

Although FIG. 3 is described as an initial strength check first being performed on client device 102, and then a secondary strength check being performed on remote server 106, other embodiments may rely on synchronous communication between client device 102 and remote server 106 to enable the simultaneous initial and secondary strength check of the created credential. In such embodiments, the synchronous communication may be enabled using, for example, Asynchronous JavaScript and XML, otherwise known as AJAX.

Figure 4:
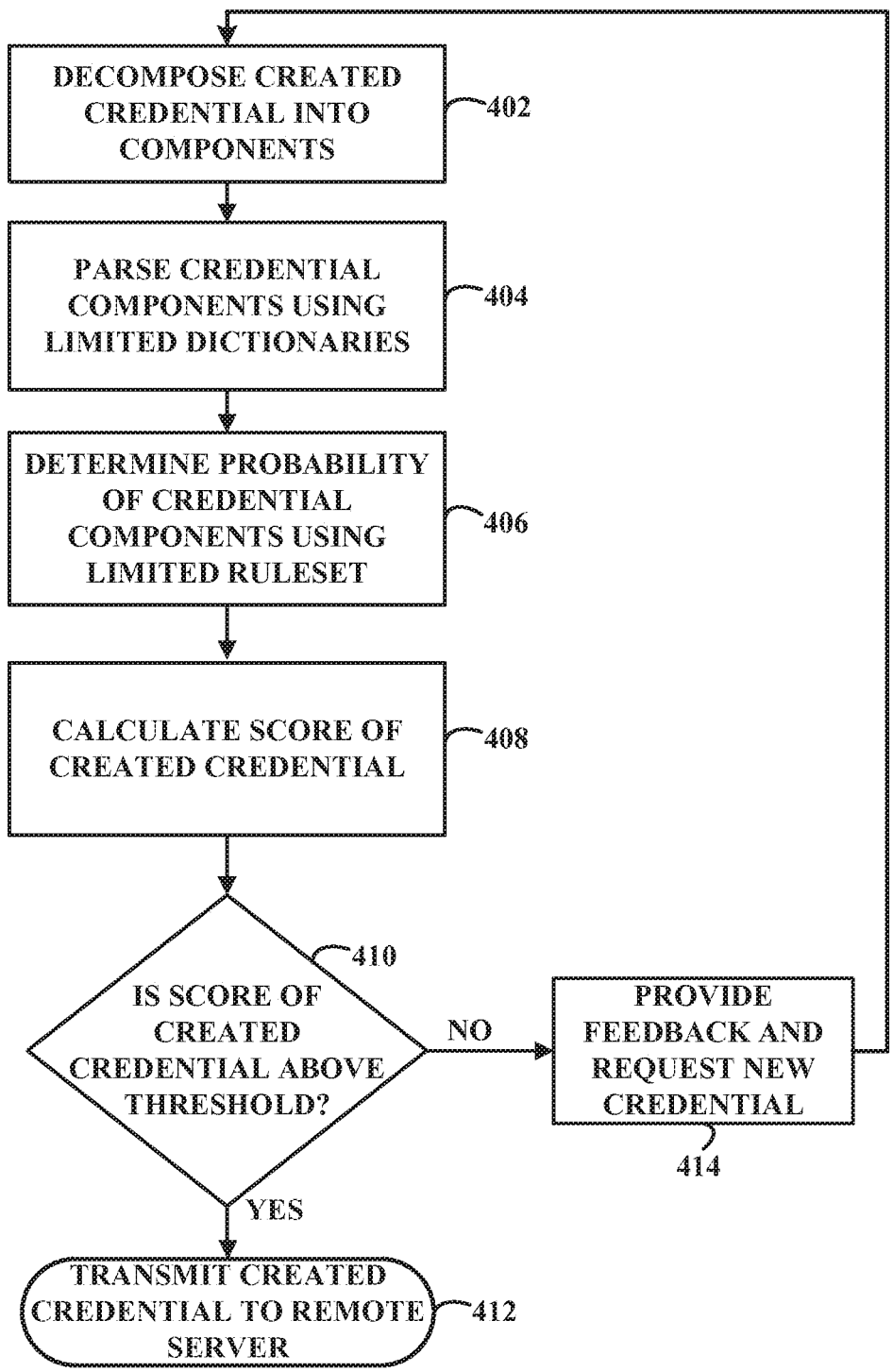
FIG. 4 is a flowchart illustrating a method for determining an initial strength of a created credential.

FIG. 4 is a flowchart illustrating a method for determining an initial strength of a created credential. For the purpose of illustration, FIG. 4 will be described with reference to FIGS. 1 and 2. The method shown in FIG. 4 may be embodied in computer-readable instructions for execution by one or more processors in processing component 206 of client device 102. According to some embodiments, the computer-readable instructions may be stored in at least one of memory 208, 210, or 212 of client device 102. As shown in FIG. 4, credential creation and strength checker app 110 as executed by processing component 206 of client device 102 decomposes a created credential into components (402). As discussed above, the created credential is created from strings of components, where the components are dictionary words, numbers, and other characters. For example, if the created credential is "jOhnsOn1998", the decomposed credential may include components of "John", "son", and "1998". The credential components may then be parsed by the processing component using limited dictionaries (404). Consistent with some embodiments, credential creation and strength checker app includes limited dictionaries including limited entries for words, characters and symbols, and numerals. Consistent with further embodiments, the limited dictionaries may be a subset of dictionaries included in and used by credential strength checker app 116 of remote server 106. Moreover, parsing the credential components includes selecting components containing words, characters and symbols, and/or numerals with the maximum coverage, such that when two paths produce the same coverage, the path of the greatest probability of occurrence as judged by the frequency of use of the rules and components) is chosen.

Returning to FIG. 4, a probability of the credential components may then be determined using a limited ruleset (406). The probability may be determined by determining a frequency indicative of a probability associated with the credential components, the frequency being an estimate of the number of occurrences of a credential component among credentials, where the estimate may be adjusted to discourage some types of components. Rulesets that may be used, may include an approximation ruleset. An approximation ruleset may provide that credentials that includes any four digit number between 1920 and 2050 is associated with a frequency/probability, any credential that includes a four digit number from a limited list (such as 1234, 0000, etc.) is associated with a second frequency/probability, and any credential including another four digit number is associated with a third frequency/probability. That is, the limited approximation ruleset may approximates a probability of a credential component occurring within a range of common components. Consistent with some embodiments, the credential component can be scored using a more detailed rule set during a secondary strength check, such as in step 312 of FIG. 3, where the number 1975 may be associated with another score than the number 1925. According to such embodiments, the first score is the average of all the scores of the numbers in the range, as determined using the detailed rule set.

Consistent with some embodiments, limited rulesets that are used include concatenation, insertion, and replacement. Concatenation is when one word is appended to the beginning or end of another word. Insertion is when a word is inserted into or within another word. Replacement is when one or more letters in the password are replaced. Consistent with some embodiments, the ruleset or rulesets that are used are limited compared to rulesets that may be used by credential strength checker app 116 of remote server 106. A score of the created credential may then be determined (408). Consistent with some embodiments, the score may be determined by the probabilities of the rules and components used and determined according to step 406. For example, a component that is not found in the limited dictionaries may have a low probability and then given a high score. However, if that word only has four letters, the determined probability may increase, and the component may be given an average score. Similarly, a component that is a four digit number starting with 19 or 20, will likely have an above average probability and, thus a lower score, since it is likely indicative of a birth or graduation year of user 104.

The calculated score may then be compared to a threshold to determine if the score of the created credential is above the threshold (410). If the score is above the threshold, the created credential will be transmitted to remote server 106 (412). Consistent with some embodiments, the created credential may undergo additional strength checking by created credential strength checker app 116. If the created credential is determined to not be sufficiently strong, credential creation and strength checker app 110 may provide feedback to user 104 and request a new credential (414). Consistent with some embodiments, feedback provided to user 104 may include a strength-meter that is displayed to user 104 on a display component 214 of client device 102 indicating a strength of the created credential. Feedback provided to user 104 may also include simply not allowing user 104 to submit the created credential. For example, credential creation and strength checker app 110 of client device 102 may perform the initial strength check on the created credential as user 104 enters the credential, only allowing user 104 to submit the created credential if it is sufficiently strong.

Although FIG. 4 is described as being performed on client device 102 using instructions stored in a memory of client device 102, other embodiments may rely on synchronous communication between client device 102 and remote server 106 to enable the initial strength check of the created credential. In such embodiments, the synchronous communication may be enabled using, for example, Asynchronous JavaScript and XML, otherwise known as AJAX.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide methods, systems, and devices that The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A client device, comprising:
a non-transitory memory storing a first word dictionary that is a subset of a second word dictionary on a remote server; and
one or more hardware processors coupled to the non-transitory memory and configured to read instructions to cause the client device to perform operations comprising:
decomposing a password into components including one or more words;
applying a concatenation ruleset, an insertion ruleset, and a replacement ruleset to the components, the applying including comparing the one or more words in the password with words in the first word dictionary;
determining a probability value for each of the one or more words based on a usage probability of each of the one or more words;
determining, by a first application on the client device, a first strength indication of the password based at least on the determined probability values for the one or more words;
in response to the first strength indication being above a threshold, requesting a second strength indication of the password based on the second word dictionary from the remote server; and
receiving a communication from the remote server regarding whether to accept or reject the password based on the second strength indication, wherein the second strength indication was determined by a second application of the remote server.

2. The client device of claim 1, wherein the operations further comprise determining that the first strength indication indicates a rejection, and in response, requesting a second password.

3. The client device of claim 2, wherein the operations further comprise displaying a strength indicator in response to determining the first strength indication.

4. The client device of claim 1, wherein the decomposing comprises parsing the one or more words from the password.

5. The client device of claim 4, wherein the one or more words are parsed from the password for maximum coverage.

6. The client device of claim 1, wherein the usage probability of each of the one or more words is based on a number of occurrences of the one or more words in a plurality of passwords.

7. The client device of claim 1, wherein the operations further comprise requesting a second password in response to the first strength indication being below the threshold.

8. A computer implemented method comprising:
receiving a password entered on a client device;
decomposing the password into components including one or more words;
applying at least one of a concatenation ruleset, an insertion ruleset, or a replacement ruleset to the components, the applying including accessing a first word dictionary stored on the client device and comparing the one or more words in the password with words in the first word dictionary;
determining, by a first application on the client device, a first strength indication for the password based at least on comparing the one or more words in the password;
in response to the first strength indication being above a threshold, requesting a second strength indication of the password based on a second word dictionary from a server device, wherein the first word dictionary is a subset of the second word dictionary; and
receiving, from the server device, content associated with the second strength indication, wherein the second strength indication was determined by a second application of the server device.

9. The computer implemented method of claim 8, wherein the method further comprises providing feedback and requesting a second credential in response to the first strength indication being below the threshold.

10. The computer implemented method of claim 9, wherein providing feedback comprises displaying a visual indication of a relative strength of the password.

11. The computer implemented method of claim 8, wherein the decomposing comprises parsing the one or more words from the password.

12. The computer implemented method of claim 11, wherein the method further comprises parsing the one or more words from the password for maximum coverage.

13. The computer implemented method of claim 11, wherein the determining of the first strength indication comprises:
determining a frequency for each of the one or more words; and
averaging the frequency of the one or more words.

14. The computer implemented method of claim 13, wherein the frequency is determined based on a number of occurrences of the one or more words in a plurality of passwords.

15. A non-transitory computer-readable medium having stored thereon machine-readable instructions executable to cause a machine to perform operations comprising:
decomposing a password into components including one or more words;
applying at least one of a concatenation ruleset, an insertion ruleset, or a replacement ruleset to the components, the applying including comparing the one or more words in the password with words in a first word dictionary;
determining a probability value for each of the one or more words based on a usage probability of each of the one or more words;
determining, by a first application on a client device, a first strength indication of the password based at least on the determined probability values for the one or more words;
in response to the first strength indication being above a threshold strength, requesting a second strength indication of the password based on a second word dictionary from a remote server; and
receiving a communication from the remote server regarding whether to accept or reject the password based on the second strength indication, wherein the second strength indication was determined by a second application of the remote server.

16. The non-transitory computer-readable medium of claim 15, wherein the operations further comprise determining that the first strength indication indicates a rejection, and in response, requesting a second password.

17. The non-transitory computer-readable medium of claim 15, wherein the operations further comprise displaying a strength indicator in response to determining the first strength indication.

18. The non-transitory computer-readable medium of claim 15, wherein the decomposing comprises parsing the one or more words from the password.

19. The non-transitory computer-readable medium of claim 18, wherein the one or more words are parsed from the password for maximum coverage.

20. The non-transitory computer-readable medium of claim 15, wherein the usage probability of each of the one or more words is based on a number of occurrences of the one or more words in a plurality of passwords.

* * * * *